Patented Nov. 21, 1939

2,180,934

UNITED STATES PATENT OFFICE 2,180,934

MOLDED PRODUCT

Harry M. Dent, Buffalo, and Arthur J. Norton, North Tonawanda, N. Y., assignors to General Plastics, Inc., North Tonawanda, N. Y.

No Drawing. Application March 19, 1935, Serial No. 11,844

2 Claims. (Cl. 154—43)

This invention relates to improved molded resin articles and to their method of preparation.

Heretofore where resinous articles of high mechanical strength and good surface finish were required, recourse might be had to either (a) molded articles or (b) laminated articles. However, where strength was required in the former and a substantially long fiber filler employed in its manufacture, requisite mechanical strength was obtained only by sacrificing surface finish and certain desirable surface characteristics associated with good resin flow over the filler and high surface finish, lost. Laminated articles possess high mechanical strength and excellent surface finish but are, as compared to molded articles, relatively costly. To obtain the advantageous surface effects upon a high strength molded article, a surface of sheet material may be impressed upon the molded article by molding with resin and a surface covering sheet.

The present invention produces an article of high surface finish and treatment, possessing some of the advantages of laminated stock, or of molded stock to which surface sheets have been molded and also provides a method of molding which, in one operation, produces an article having a core of relatively low resin content and a surface of sheet material and resin possessing high surface treatment, gloss and resin content and of high water resisting properties.

The improved molded resin article of the present invention, therefore, produces a molded article in one piece and in one operation possessing high mechanical strength and suitable for uses where laminated was formerly used, possessing excellent surface finish and treatment and producing in one operation a low cost molded article possessing substantially all the advantages inherent in the high strength more expensive laminated stock. In the preparation of the articles of this invention the usual type mold can be used, as for instance, a single cavity mold by placing in the mold a resin impregnated facing paper of desired strength and thickness and thereafter filling the mold with the desired quantity of core material. An upper resin impregnated facing paper is thereafter placed upon the core material of resin and filler and this layered material subjected to molding temperatures and pressures. The facing paper flows together, and in effect fuses and seals the edges of the article being produced and forms upon the surface thereof a highly polished and surface treated molded article, the strength of which is enhanced by the surrounding paper strip and an article highly resistant to entrance of water and which at the same time possesses decorative qualities, an article, therefore, eminently suitable for many construction and architectural purposes. The article produced by the present invention is prepared from core material possessing a relatively low resin content and a relatively high filler content as compared with the usual molding mixtures. Good results have been obtained by the use of a mixture containing about 15 to 20% of heat hardenable resin such as a thermosetting phenol formaldehyde resin of the type commonly called "Durez."

The resin impregnated sheets comprise paper sheets or the like impregnated with resin in the known manner. In the preparation of articles of about ⅛" in thickness 7 mil paper was found to be satisfactory, the paper being impregnated to a resin content of about 60 to 65%.

The molding operation can also be performed by using preformed pellets of the powdered resin and filler mixture. The pellets are laid upon the paper in the mold, the upper paper sheet laid thereover and the whole subjected to molding temperatures and pressures, i. e., pressures of about 1000 to 3000 pounds at about 100 to 120 pounds of steam.

The article produced possesses a high resistance to entrance of water, the water absorption amounting to about .08% as compared with about 3% on straight laminated stock; the tests being carried out by the standard test, that is, immersion in water for 48 hours at room temperature. The article of the present invention further possesses the advantage that substantially no swelling occurs at the marginal edges, an occurrence usually noticeable with laminated stock where the water appears to get into the interior by capillary attraction between the sheets of paper and into the fibers of the paper, thus swelling the laminated stock along the edge.

Although the invention has been described and exemplified by the use of heat hardenable phenol formaldehyde resins, it will be understood that thermosetting resins generally may be substituted for phenol formaldehyde resin; it will be also understood that sheet material of various kinds may be substituted for paper as the facing sheet.

From the above it will be seen that the present invention describes a new molded article suitable for use as breaker strips in refrigerators, in automotive body work and in general wherever a highly water resistant and high surface treated construction material possessing high mechanical strength is required.

What is claimed is:

1. A molded article comprising two exterior surface strengthened faces and a core, said faces comprising a filler of fibrous sheet material included within hardened phenolic resin, said core comprising a hardened phenolic resin and powdered filler uniformly distributed therethrough, the surface strengthened faces containing about 60 to 65% resin, the core containing about 15 to 20% resin.

2. A molded article comprising two exterior surface strengthened faces and a core, said faces comprising a filler of fibrous sheet material included within hardened phenolic resin, said core comprising a hardened phenolic resin and powdered filler uniformly distributed therethrough, the surface strengthened faces containing about 60 to 65% resin, the core containing about 15 to 20% resin, the water absorption of said article being about 0.08%.

HARRY M. DENT.
ARTHUR J. NORTON.